United States Patent [19]
Whitledge et al.

[11] 3,785,050
[45] Jan. 15, 1974

[54] COUPLING ATTACHMENT DEVICE

[75] Inventors: Jon K. Whitledge, Mantua; Edward M. Kavick, Chardon, both of Ohio

[73] Assignee: Samuel Moore & Company, Mantua, Ohio

[22] Filed: Jan. 7, 1972

[21] Appl. No.: 216,093

[52] U.S. Cl..................................... 29/237, 29/263
[51] Int. Cl............................................ B23p 19/02
[58] Field of Search.................... 29/237, 251, 256, 29/263, 282, 283; 72/454

[56] References Cited
UNITED STATES PATENTS
1,167,418   1/1916   Lennon................................ 29/283
3,048,212   8/1962   Morrison .............................. 29/237
3,028,987   4/1962   Hecke................................... 72/454

FOREIGN PATENTS OR APPLICATIONS
21,049   8/1915   Great Britain........................ 29/237

Primary Examiner—James L. Jones, Jr.
Assistant Examiner—J. C. Peters
Attorney—Clelle W. Upchurch

[57] ABSTRACT

An apparatus is provided for fastening a fitting to the end of a hose having a ball nut and ball screw carrying a pusher means for pressing a fitting and hose assembly into a swaging die, the pusher means comprising a bearing which transfers the force of the rotating screw to the non-rotating pusher means.

6 Claims, 4 Drawing Figures

PATENTED JAN 15 1974 3,785,050

COUPLING ATTACHMENT DEVICE

This invention relates generally to a device for swaging a fitting over the end of a tube or hose and more particularly to a manually actuated portable hose coupling apparatus.

An apparatus for securing a fitting to a hose is disclosed in U.S. Pat. No. 3,048,212. Such an apparatus has been found to be advantageous for swaging a metallic coupler or similar fitting on the end of a hose but it has the disadvantage that it must be mounted on a bench or the like and is too heavy and bulky to be easily transported from place to place.

It is an object of this invention to provide a portable hand hose coupling apparatus. Another object of the invention is to provide a manually operated coupling device which is adapted to be moved easily from place to place or to be secured to a bench. A more specific object of the invention is to provide a hand actuated swaging device which is small enough to be held by an operator while being used and to be carried from place to place with a minimum of effort.

Other objects will become apparent from the following description with reference to the accompanying drawing in which.

The foregoing objects and others are accomplished in accordance with this invention, generally speaking, by providing a swaging device having a supported ball screw and ball nut assembly, a swaging die, a means on one end of the screw for pressing a hose and fitting into the swaging die to secure them together when the ball screw is rotated, and a means for rotating the ball screw in the ball nut. The means for pressing a hose and fitting into the swaging die includes a pusher holder rigidly secured to the screw. The pusher holder is adapted to receive a pusher element which holds a fitting and hose together and presses them into a swaging die as the screw is rotated to rigidly secure the two together. The pusher element is supported in a cavity of the holder by a thrust bearing which rotates with the screw. The roller bearings of the thrust bearing rotate about their axis as the screw rotates and impart thrust to the pusher without the pusher being rotated with the screw. Hence, the fitting and hose assembly are pressed into the swaging die as the screw moves towards the die without rotation of the assembly. The thrust bearing has a circular race enclosing spaced roller bearings and is press fit or otherwise secured in the cavity of the pusher holder. A ball screw and ball nut are used to eliminate the friction normally associated with a conventional nut and screw arrangement and to thereby minimize the forces required for turning the screw for swaging. The ball screw is provided with a helical rounded thread which mates with a helical rounded internal thread in the ball nut to form a bearing race. Ball bearings lie in the passageway formed by the mating threads and move with the ball screw as it turns and moves longitudinally with respect to the swaging die. A passageway for balls moving from one end of the bearing race extends to the opposite end of the race so that the balls move continuously through the passageway as the screw is rotated.

Figure 1:
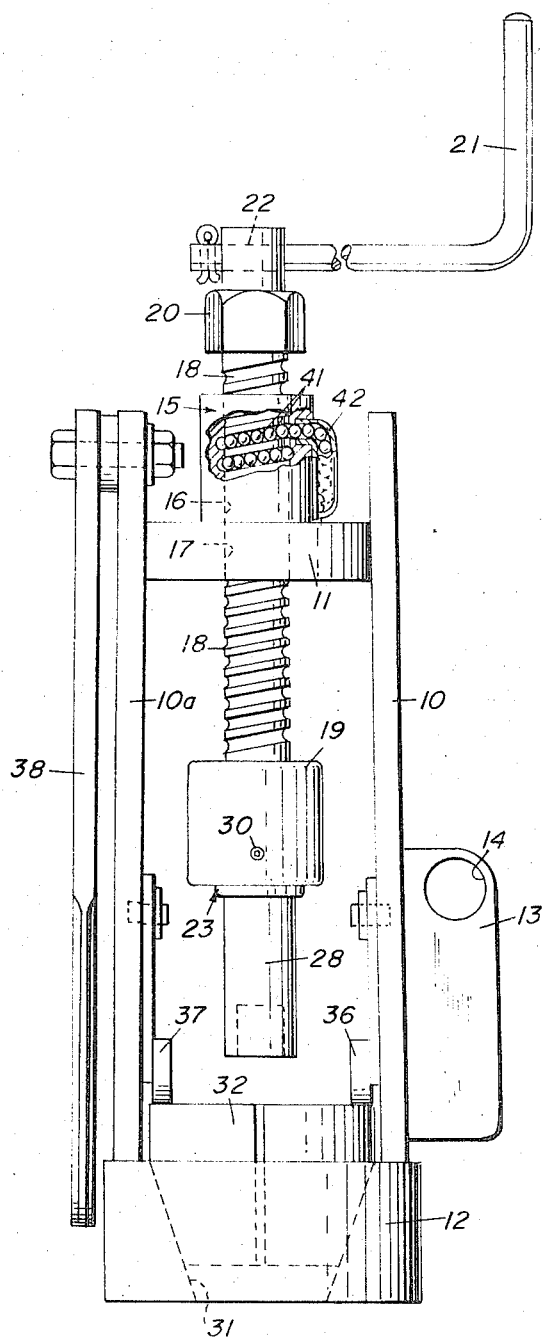
FIG. 1 is a front elevation, partially in section, of one embodiment of the invention.
Figure 2:
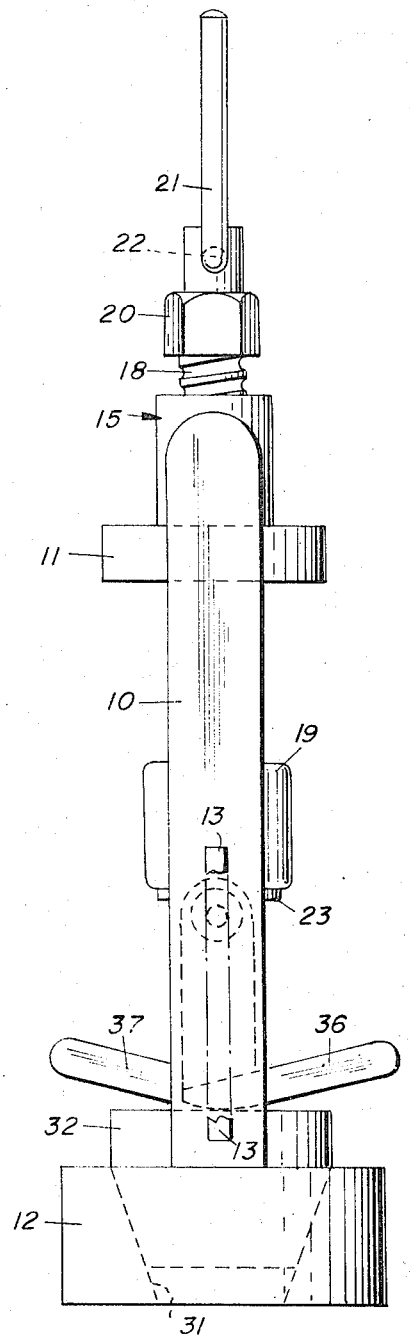
FIG. 2 is a side elevation of the embodiment of FIG. 1.

Referring now to the drawing and particularly to FIGS. 1 and 2, spaced bars 10 and 10a are welded or otherwise rigidly secured to plate 11 and to base 12. Bracket 13 is welded or otherwise rigidly secured to member 10. A hole 14 may be drilled in bracket 13 to be used as a rope lifting eye.

A ball nut 15 is secured against rotation and end thrust to plate 11 and has a bore 16 therethrough aligned with a bore 13 in plate 11. Ball screw 18 extends above ball nut 15, through the bores 16 and 17. A pusher holder 19 is press fit on the lower end and a hexagonal nut 20 is fixed near the upper end of ball screw 18. Crank handle 21 may be inserted in opening 22 in screw 18 to turn ball screw 18 and move pusher holder 19 longitudinally with respect to die base 12.

Figure 4:
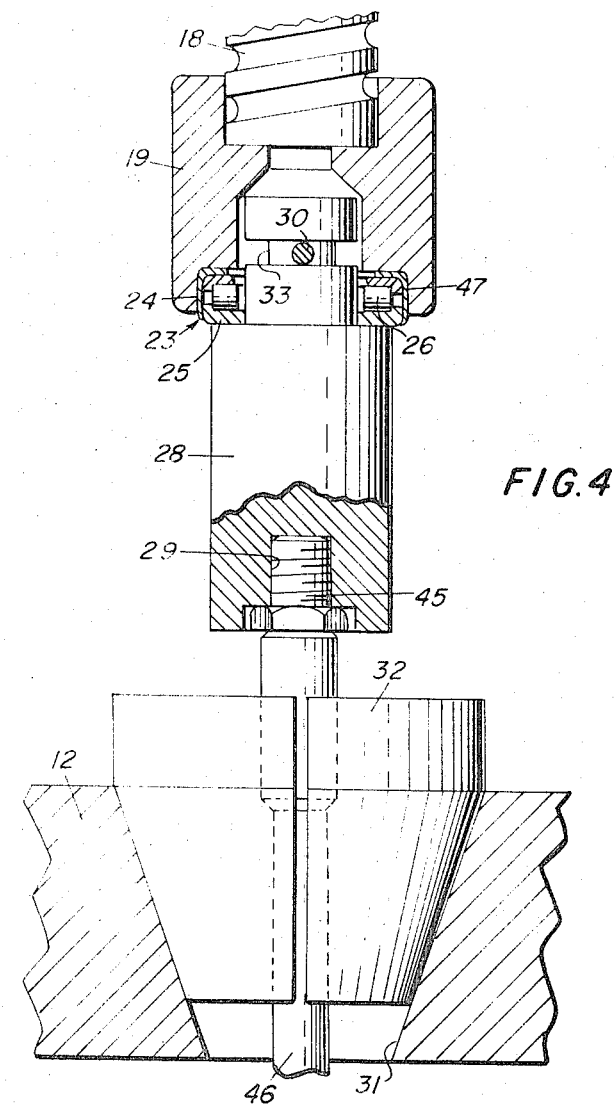
FIG. 4 is an enlarged fragmentary elevation, partially in section, of one embodiment of a pusher and swaging die assembly of the apparatus.

As illustrated best in FIG. 4, thrust bearing 23 is press fit in the lower portion of cavity 24 of pusher holder 19. Upper race 47 and lower race 25 of thrust bearing 23 enclose circumferentially spaced roller bearings 26 and spacer elements therebetween. A pusher 28 has an annular groove 33 in its outer surface and a cavity 29 in its base adapted to receive a fitting and hose assembly. The cross-section of pusher 28 above and below groove 30 is slightly less than the cross-section of cavity 24 so holder 19 will not turn pusher 28 as it is rotated by screw 18. Screw 30 extends into groove 33 and prevents pusher 28 from moving longitudinally. The upper race 47 of thrust bearing 23 is rotated with pusher holder 19. Lower race 25 engages the shoulder of pusher 28 and both the lower race 25 and pusher 28 are free to rotate with the pusher holder 19 until friction between the fitting and die stops the rotation thereof. Less force is required to turn the screw during swaging because of use of the thrust bearing.

Figure 3:
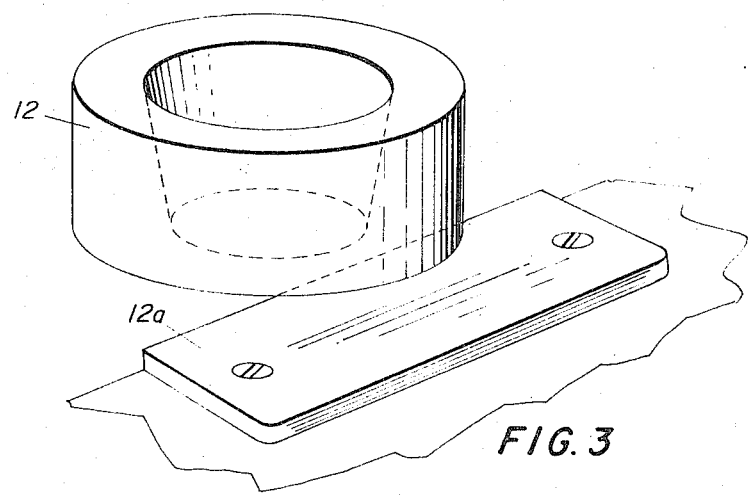
FIG. 3 is a perspective view of a die base and support for the apparatus provided by the invention.

As shown in FIGS. 3 and 4 die base 12 has a substantially frusto-conically shaped bore 31 therethrough. Die 32 is split longitudinally into two equal segments. The assembled segments have a frusto-conical shape which matches that of bore 31. The assembled segments are adapted to fit snugly in bore 31. Substantially L-shaped die clamp members 36 and 37 are bolted or otherwise pivotally secured near the tops thereof to members 10 and 10a. The vertical parts of clamps 36 and 37 extend longitudinally alongside members 10 and 10a and are welded or otherwise rigidly secured to arms which extend outwardly at an acute angle therewith. That edge of each of clamps 36 and 37 facing base 12 has an arcuate shape to adapt it for pressing the segments of die member 32 in bore 31.

Leverage arm 38 may be pivotally secured at one end to one end of support member 10a.

The helical threads of screw 18 have a rounded base while the bore of nut 15 has helical rounded internal threads of the same pitch as the threads of the screw. The matching threads provide a helical bearing race or passageway of circular cross-section for balls 41. A transfer passage 42 secured to the wall of nut 15 provides means for balls leaving the helical passageway ending at one end of nut 15 to be returned to the helical passageway beginning at the opposite end of nut 15.

In operation, bracket 13 may be secured in a suitable vise to support the swaging machine with its longitudinal axis in a substantially horizontal plane. A slit die 32 having a die cavity of suitable dimensions is placed in bore 31 in die base 12. Clamps 36 and 37 are pushed towards die base 12 until they press against die members 32 and secure them in bore 31. A pusher element 28 having a cavity 29 adapted to hold the fitting to be swaged on a hose is inserted through thrust bearing 23 and set screw 30 is rotated until it extends into groove 33. The dimensions of pusher 28 and the depth of penetration of set screw 30 are such that pusher 28 is not secured in holder 19 for rotation with screw 18. A hose 46 with a fitting 45 on one end is inserted through the opening in die 32 and inserted in the cavity 29 of pusher 28. Crank handle 21 is turned. Screw 18 rotates in nut 15 and pusher holder 19 is rotated therewith as it moves towards die 32. The force of the rotating screw 18 is transferred to the non-rotating pusher through thrust bearing 23. Fitting 45 is forced into the cavity in die 32 and swaged about the end of hose 46. The direction of rotation of crank 21 is reversed to move pusher 19 away from die 32. Clamps 36 and 37 are moved away from die 32 and the die and swaged fitting may be removed from the bore 31 in base 12. The segments of die 32 separate to release the swaged fitting.

If a vise is not available, the swaging machine may be held by leverage handle 38 to prevent rotation as screw 18 is turned. The base 12 may be placed on the floor or on a table top in such an operation or one man can hold the frame and leverage arm while the other rotates the crank handle.

Bracket 12a may be welded to the bottom of base 12 as illustrated in FIG. 3 to replace bracket 13, if desired. Bracket 12a may be bolted to a bench top to hold the swaging machine in an upright position with the bore disposed beyond the edge of the bench.

Any suitable means may be provided for turning the screw in the ball nut. For example, a conventional socket and ratchet may be substituted for the crank 21 shown in the drawing.

The size of the apparatus need not be great to provide the torque required to swage a fitting on a hose. For example, a one-inch diameter ball screw about seven and one-half inches long may be supported on a suitable frame of the type illustrated in the drawing to provide an overall length of the apparatus of less than 15 inches when the pusher is resting on the swaging die. Such an apparatus is relatively light in weight and adapted to be moved from place to place.

Suitable ball screw and ball nut assemblies are available commercially. Any suitable one of these may be used. One of the type disclosed in U.S. Pat. No. 2,836,075 or a similar assembly may be used, if desired.

Any suitable thrust bearing may be used. One which has been used to advantage is a Type TTSP, Number T-77 Tinken Bearing.

Although the invention has been described in detail for the purpose of illustration, it is to be understood that such detail is solely for that purpose and that variations may be made by those skilled in the art without departing from the spirit and scope of the invention except as it may be limited by the claims.

What is claimed is:

1. An apparatus for securing a fitting to a hose which comprises a ball screw and ball nut assembly, a swaging die having a die cavity adjacent one end of the screw with the cavity aligned with the screw, means for supporting said ball nut and said die against relative longitudinal movement and against rotation with the screw comprising laterally spaced longitudinally extending bars, a cross bar spanning and rigidly secured to the ball nut and to the spaced bars, a die base longitudinally spaced from the cross bar and spanning said spaced bars and rigidly secured thereto, means in the die base to support the swaging die, means carried by said end of the screw for pressing a fitting and hose assembly in said die cavity comprising a holder element secured to the said screw end for rotation therewith and having a cavity therein, a pusher element having one end in the cavity of the holder element and an opposite end adapted to support a fitting and hose assembly as it is moved towards the die cavity, means for securing the pusher element in the cavity of the holder element against rotation with the screw and against substantial longitudinal movement relative to the screw comprising a thrust bearing in the cavity of the holder element and about the said pusher, and means for turning the screw in the nut.

2. The apparatus of claim 1 comprising a clamp pivotally mounted on each of the spaced bars and adapted to press the die in the die base cavity.

3. The apparatus of claim 1 wherein said supporting means carries a bracket for securing the apparatus in a stationery position.

4. The apparatus of claim 1 wherein the swaging die is split longitudinally into a plurality of segments.

5. The apparatus of claim 4 wherein one of said spaced bars carries a leverage arm pivotally secured near one end to the bar for securing the supporting means against movement as the screw is turned.

6. The apparatus of claim 1 wherein that portion of the pusher element adapted to be disposed in the cavity in the holder element has an annular external groove, said holder element carries a set screw adapted to extend into the groove and said thrust bearing has circumferentially spaced roller bearings which transmit axially force to the pusher as the screw turns.

* * * * *